US012567339B2

(12) United States Patent
Sanchez et al.

(10) Patent No.: US 12,567,339 B2
(45) **Date of Patent: *Mar. 3, 2026**

(54) SYSTEMS AND METHODS FOR IMPROVING DRIVER SAFETY USING UPLIFT MODELING

(71) Applicant: QUANATA, LLC, San Francisco, CA (US)

(72) Inventors: Kenneth J. Sanchez, San Francisco, CA (US); Blake Konrardy, San Francisco, CA (US); Eric Dahl, Newman Lake, WA (US); Aaron Shimer, Evanston, IL (US); Micah Wind Russo, Oakland, CA (US); Theobolt N. Leung, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 18/084,899

(22) Filed: Dec. 20, 2022

(65) Prior Publication Data

US 2023/0120138 A1 Apr. 20, 2023

Related U.S. Application Data

(63) Continuation of application No. 16/177,036, filed on Oct. 31, 2018, now Pat. No. 11,562,656.

(Continued)

(51) Int. Cl.
| | |
|---|---|
| *G09B 9/052* | (2006.01) |
| *B60G 9/00* | (2006.01) |
| *G09B 5/00* | (2006.01) |
| *B60K 35/10* | (2024.01) |
| *B60K 35/22* | (2024.01) |

(Continued)

(52) U.S. Cl.
CPC ................. *G09B 5/00* (2013.01); *B60G 9/00* (2013.01); *G09B 9/052* (2013.01); *B60K 35/10* (2024.01); *B60K 35/22* (2024.01); *G06Q 40/08* (2013.01); *G09B 5/02* (2013.01); *G09B 5/06* (2013.01); *G09B 9/04* (2013.01)

(58) Field of Classification Search
CPC ............................... G09B 9/052; G06Q 40/08
USPC ........................................................ 434/65
See application file for complete search history.

(56) References Cited

U.S. PATENT DOCUMENTS

| | | | |
|---|---|---|---|
| 8,572,011 B1 | 10/2013 | Sculley, II | |
| 8,935,036 B1 * | 1/2015 | Christensen | ......... G08G 1/0129 701/29.3 |

(Continued)

*Primary Examiner* — Thomas J Hong
(74) *Attorney, Agent, or Firm* — BRYAN CAVE LEIGHTON PAISNER LLP

(57) ABSTRACT

Methods and systems for improving vehicular safety by utilizing uplift modeling techniques to improve a driving tip treatment generation model are provided. According to embodiments, a tip server can analyze telematics data associated with operation of one or more vehicles to determine that a driving tip should be provided to a driver of a vehicle. The tip server then utilize a treatment generation model to determine a treatment for how to provide the driving tip in a manner optimized for the particular driver. The tip server can analyze additional telematics data to determine an effectiveness of the driving tip and to update the treatment generation model in accordance with uplift modeling techniques.

21 Claims, 5 Drawing Sheets

Related U.S. Application Data

(60) Provisional application No. 62/590,771, filed on Nov. 27, 2017.

(51) Int. Cl.

|  |  |
|---|---|
| *G06Q 40/08* | (2012.01) |
| *G09B 5/02* | (2006.01) |
| *G09B 5/06* | (2006.01) |
| *G09B 9/04* | (2006.01) |

(56) References Cited

U.S. PATENT DOCUMENTS

| | | | |
|---|---|---|---|
| 10,467,488 B2 | 11/2019 | Sicconi et al. | |
| 2002/0091473 A1 | 7/2002 | Gardner et al. | |
| 2006/0200277 A1 | 9/2006 | Yoshida et al. | |
| 2014/0274243 A1 | 9/2014 | Lopez et al. | |
| 2015/0314722 A1 | 11/2015 | Mori et al. | |
| 2016/0180737 A1* | 6/2016 | Clark | G09B 5/02 |
| | | | 434/236 |
| 2017/0371925 A1 | 12/2017 | Arya et al. | |
| 2018/0114453 A1* | 4/2018 | Jain | G09B 5/14 |
| 2018/0190140 A1 | 7/2018 | Ackermann et al. | |

* cited by examiner

SYSTEMS AND METHODS FOR IMPROVING DRIVER SAFETY USING UPLIFT MODELING

CROSS-REFERENCE TO RELATED APPLICATIONS

This application is a continuation of U.S. patent application Ser. No. 16/177,036, filed Oct. 31, 2018, which claims the benefit of U.S. Provisional Patent Application No. 62/590,771, entitled "Systems and Methods for Improving Driver Safety Using Uplift Modeling" and filed on Nov. 27, 2017, the entire disclosures of which are hereby incorporated herein by reference in their entirety.

FIELD OF THE DISCLOSURE

This disclosure generally relates to improving driving or vehicular safety, and in particular, to applying uplift modeling techniques to improve the effectiveness of how tips are provided to drivers.

BACKGROUND

There is a constant effort to improve vehicular safety to, among other reasons, reduce the risk of accidents as well as mitigate the damage caused by accidents. Various existing techniques aim to reduce the risk of accidents such as, for example, websites that provide general tips on safe driving and various applications that examine driving data to identify relevant tips to provide to drivers. However, these techniques are not able to accurately measure the effectiveness of how the tips provided to the driver (e.g., the channel the tip was provided, when the tip was provided, and so on).

Further, these traditional tip provision techniques tend to rely on A/B testing techniques that present two versions of a tip to random users and measure which tip led to the best outcomes. The tip generation models are then adjusted based on these measurements associated with the random users. However, improving the efficacy of a tip provided across a pool of random participants may not actually improve the tip efficacy for each individual participant. Said another way, while A/B testing may lead to an effective result when the same tip is provided to all drivers, A/B testing is not effective at tailoring driving tips to particular drivers.

Accordingly, there is an opportunity to develop systems and methods for analyzing the provision of driving tips to ensure that drivers receive tips that are tailored to their individual characteristics to improve the tip efficacy for each individual driver.

SUMMARY

In an embodiment, a computer-implemented method is provided. The method may include (1) receiving a first set of telematics data associated with a vehicle driven by a driver; (2) analyzing, by one or more processors, the first set of telematics data to determine that a driving tip should be provided to the driver; (3) generating, using a treatment generation model, a treatment for providing the driving tip to the driver, the treatment including a channel of delivery, a timing of delivery, and a tip content, wherein the treatment generation model utilizes uplift modeling techniques; (4) in accordance with the treatment, providing, by the one or more processors, the driving tip to the driver associated with the vehicle; (5) after the provision of the driving tip, receiving a second set of telematics data associated with the vehicle; (6) determining, by the one or more processors, an effectiveness of the driving tip; and (7) based on the effectiveness of the driving tip, updating, by the one or more processors, the treatment generation model. The method may include additional, fewer, or alternative actions, including those described elsewhere herein.

In another embodiment, a computer system may be provided. The computer system may include (i) one or more processors; (ii) one or more transceivers adapted to communicate with a vehicle driven by a driver; and (iii) a non-transitory program memory coupled to the one or more processors and storing executable instructions. The instructions, when executed by the one or more processors, may cause the computer system to (1) receive, via the one or more transceivers, a first set of telematics data associated with the vehicle; (2) analyze the first set of telematics data to determine that a driving tip should be provided to the driver; (3) generate, using a treatment generation model, a treatment for providing the driving tip to the driver, the treatment including a plurality of facets, wherein the treatment generation model utilizes uplift modeling techniques; (4) provide the driving tip to the driver in accordance with the treatment; (5) after the provision of the driving tip, receive, via the one or more transceivers, a second set of telematics data associated with the vehicle; (6) determine an effectiveness of the driving tip; and (7) update the treatment generation model based on the effectiveness of the driving tip. The computer system may include additional, fewer, or alternative components that perform additional, fewer, or alternative functions, including those described elsewhere herein.

In yet another embodiment, a non-transitory computer readable storage medium storing processor-executable instructions may be provided. The instructions, when executed, may cause one or more processors to (1) receive a first set of telematics data associated with the vehicle; (2) analyze the first set of telematics data to determine that a driving tip should be provided to the driver; (3) generate, using a treatment generation model, a treatment for providing the driving tip to the driver, the treatment including a plurality of facets, wherein the treatment generation model utilizes uplift modeling techniques; (4) provide the driving tip to the driver in accordance with the treatment; (5) after the provision of the driving tip, receive a second set of telematics data associated with the vehicle; (6) determine an effectiveness of the driving tip; and (7) update the treatment generation model based on the effectiveness of the driving tip. The computer readable storage medium may store instructions that cause the one or more processors to perform additional, fewer, or alternative steps, including those described elsewhere herein.

DETAILED DESCRIPTION

Figure 1:
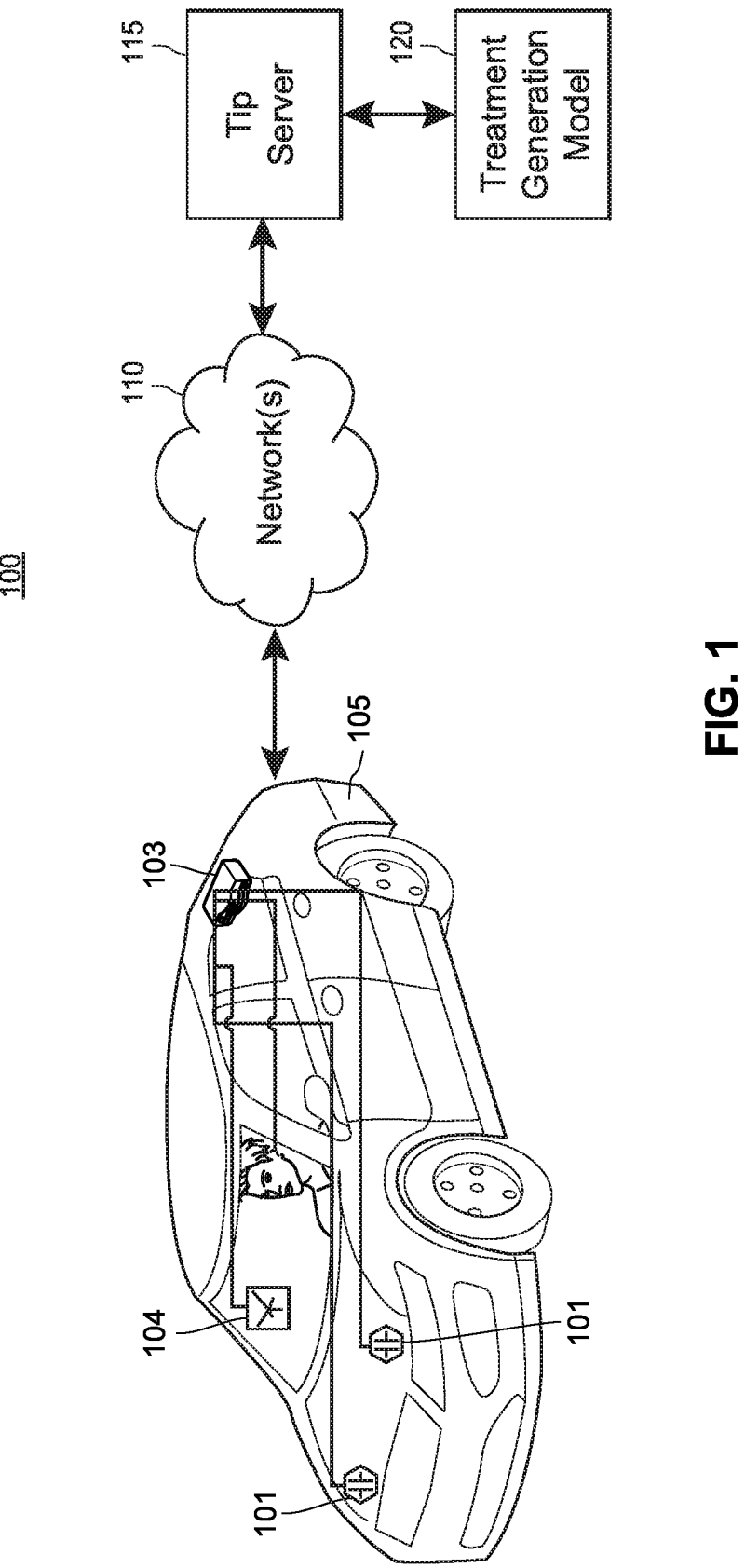
FIG. 1 depicts an example environment including components and entities associated with applying uplift modeling techniques to improve a treatment generation model in accordance with some embodiments.

The methods and systems disclosed herein generally relate to applying uplift modeling techniques in order to improve a tip treatment generation model that determines how driving tips are provided to drivers. More particularly, the uplift modeling techniques are applied to improve one or more treatment facets. As it is generally used herein, "treatment" refers to the combination of facets associated with the provision of a driving tip. For example, one facet may be a channel of delivery (such as via a short message service (SMS), a push notification, an email, a vehicle-based alert, a statement on a bill or other letter mailed (electronically or physically) to the driver. Another facet may be a timing of when a tip is delivered (such as immediately, at the onset of a trip, at the termination of a trip, or on a periodic basis). Yet another facet may be a content included in the tip beyond the tip itself (such as the inclusion of an amount of money that can be saved, a statistic (such as a likelihood of damage or injury), a comparison to other drivers, an indication of performance over time, and so on). A still further facet may include a tone at which the tip is provided (such as encouraging, polite, authoritative, instructional). Of course, the uplift modeling techniques may also be applied to any number of additional treatment facets.

According to embodiments, a tip server may be configured to receive telematics data from one or more vehicles, where the telematics data includes vehicle operation data. The tip server may analyze the telematics data to determine whether a tip should be provided to a driver. One such system that describes whether or not driving tips should be provided to a driver is described in co-owned U.S. Pat. No. 8,935,036 entitle "Systems and Methods for Updating a Driving Tip Model Using Telematics Data," the entire disclosure of which is hereby included by reference. If the tip server determines that a driving tip should be provided to the driver, the tip server may utilize a treatment generation model to determine a treatment for the provision of the driving tip.

To generate the treatment by utilizing uplift modeling, the treatment generation model may first determine a set of drivers that have similar demographic and/or geographic characteristics in common with the driver of the vehicle. For each treatment facet, the treatment generation model may assign a weight to each option based on an effectiveness of that option for drivers within the set of drivers. As an example, the treatment generation model may have determined that a particular demographic is more inclined to follow a driving tip if an amount of money that could be saved is included with the tip. Accordingly, if the driver belongs to that demographic, a cost savings option may be associated with a higher weight than a past performance option.

In another aspect, the treatment generation model may associate each option with a confidence score based on the sample size of treatment responses for drivers with the set of drivers. To this end, if there are relatively few samples, the treatment generation model may be less confident that the currently favored option is the most effective option. Accordingly, even though the currently favored option may be associated with a relatively high weight, the treatment generation model may assign that option a relatively low confidence score.

Based on the weight and the confidence score for each option, the treatment generation model may select a particular option for each facet of the treatment. More particularly, the treatment generation model may combine the weight and the confidence score to generate a percentage for each option. Then, the treatment generation model may randomly select an option such that the percentage is the likelihood of random selection for each option.

Additionally, the tip server may receive a second set of telematics data from the vehicle to determine an effectiveness of the treatment. For example, the driving tip may relate to driving slower on freeways. If the second set of telematics indicates that the driver did, in fact, drive slower while on a freeway, the tip server may determine that the treatment was effective. On the other hand, if the driver continued to drive about as fast as before, if not faster, then the tip server may determine that the treatment was ineffective.

Based on the analysis, the tip server may update the treatment generation model. That is, the tip server may increase the weights for the selected option if the treatment was effective, and/or decrease the weights for the selected option if the treatment was ineffective. Thus, the likelihood of selecting the previously-effective options are "uplifted" such that they are more likely to be selected when generating a subsequent driving tip for the driver. As a result, the treatment generation model is adapted over time to reflect the most effective options for the driver.

Therefore, the application of uplift modeling improves how driving tips are provided to drivers. To this end, unlike traditional A/B testing, uplift modeling relies on individual characteristics in determining a treatment for providing a driving tip to a driver. As a result, for newer drivers, the treatment generation model is able rely on the impact on a particular treatment option on similar drivers to generate a driving tip treatment that is more likely to result in the driver following the driving tip. Moreover, over time the treatment generation becomes tailored to the individual driver, in effect creating a unique treatment generation model that is more likely to provide driving tips in a manner that the driver will alter their behavior accordingly. Said another way, the use of uplift modeling to generate driving tip treatments utilizes data not traditionally relied upon to improve the accuracy of how a computer model models human performance.

FIG. 1 depicts an example environment 100 for applying uplift modeling techniques to improve a treatment generation model. As illustrated in FIG. 1, the environment 100 may include a vehicle 105. Although the vehicle 105 is depicted as a car, the vehicle 105 may also be, for example, a truck, a motorcycle, a motorbike, a scooter, a boat, a recreational vehicle, or any other type of vehicle capable of being operated or driven by a vehicle operator. The vehicle 105 may include one or more sensors 101 that monitor the operational status of the vehicle 105. The sensors 101 may include, for example, a pressure sensor, a gyroscope, an accelerometer, an odometer, a vibration sensor, a microphone, an image sensor, a temperature sensor, and/or a radar or LIDAR sensor. Some of the sensors 101 may be included in the vehicle 105 by a manufacturer of the vehicle 105 and others of the sensors 101 may be retrofitted onto the vehicle 105 at some point after manufacture.

The vehicle 105 may further include an electronic device 103 configured to interpret operational data generated by the sensors 101. Although FIG. 1 illustrates the electronic device 103 as a processing unit of the vehicle 105 interconnected to the sensors 101 via a communication bus of the vehicle 105, in other embodiments the electronic device 103 may be a personal electronic device (e.g., a mobile phone, a tablet, a laptop computer, a smart watch, smart glasses, other types of wearable electronics, an on-board diagnostic monitor, and so on) associated with an operator of the vehicle 105. In these embodiments, the personal electronic device may receive the operational data via a wireless interface (e.g., a Bluetooth interface, a Wi-Fi interface, or other known wireless communication interfaces) or a wired interface (e.g., an OBD port, a USB interface, an auxiliary interface, or other known wired communication interfaces). Further, in embodiments where the electronic device 103 is a personal electronic device, one or more of the sensors 101 may reside in the electronic device 103, as opposed to being affixed to the vehicle 105.

The vehicle 105 may be configured to communicate with a tip server 115 via one or more communication networks 110. The networks 110 may facilitate any data communication between the vehicle 105 and a tip server 115 via any standard or technology (e.g., GSM, CDMA, TDMA, WCDMA, LTE, EDGE, OFDM, GPRS, EV-DO, UWB, IEEE 802 including Ethernet, WiMAX, and/or others). According to present embodiments, the vehicle 105 collects and transmits telematics data generated by the sensors 101 to the tip server 115 via the networks 110.

According to certain aspects, the tip server 115 may be configured to analyze the received telematics data to determine whether a driving tip should be provided to a driver of the vehicle 105. If the tip server 1115 determines that a driving tip should be provided to the driver, the tip generation server may interact with a treatment generation model 120 to generate a treatment for the provision of the driving tip. In another aspect, the tip server 115 may update the treatment generation model 120 based on the driver's response to the driving tip. In some embodiments, the treatment generation model 120 may reside in a memory at the tip server 115. In other embodiments, the treatment generation model 120 is stored at a dedicated server specifically configured for the execution of algorithms associated with uplift modeling.

Although FIG. 1 depicts certain entities and components, it should be appreciated that additional or alternate entities and components are envisioned. For example, although FIG. 1 illustrates a single tip server 115, it should be appreciated that in some embodiments, the tip server 115 may be a plurality of interconnected servers, for example, in a cloud computing environment.

Figure 2:
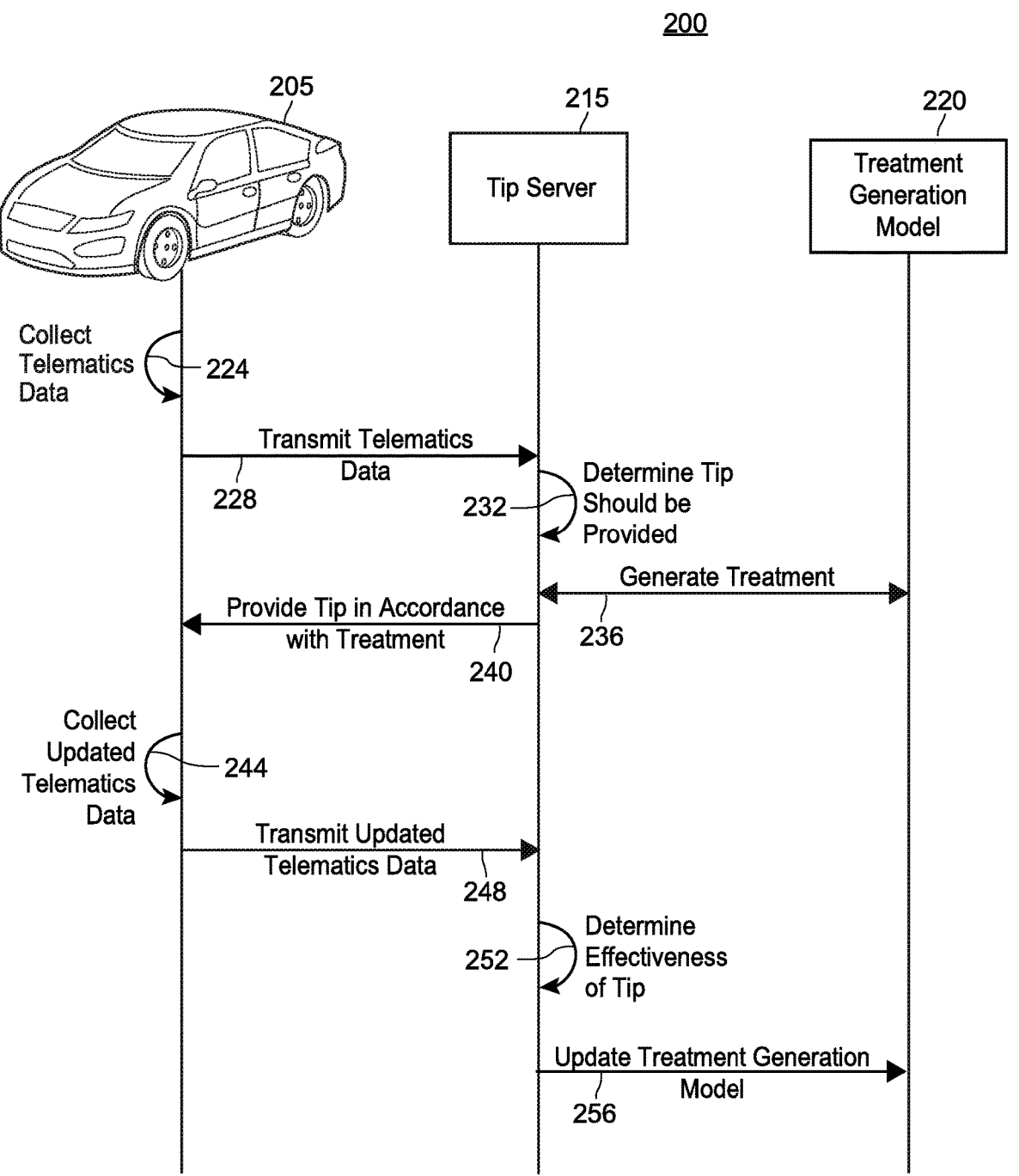
FIG. 2 depicts an example diagram associated with providing driving tips and updating treatment generation models in accordance with some embodiments.

Referring to FIG. 2, depicted is a signal diagram 200 illustrating techniques for providing driving tips and updating treatment generation models. In particular, FIG. 2 includes a vehicle 205 (such as the vehicle 105 as described with respect to FIG. 1) and a tip server 215 (such as the tip server 115 as described with respect to FIG. 1) in communication with a treatment generation model 220 (such as the treatment generation model 120 as described with respect to FIG. 1).

The signal diagram 200 may begin when the vehicle 205 collects (224) telematics data from one or more sensors of the vehicle 205 and/or a personal electronic device associated with the vehicle 205. The telematics data can include vehicle data such as speed, lateral and longitudinal acceleration, revolutions per minute (RPM), seat belt usage, turn signal usage, steering data, throttle data, video and/or audio data collected by a camera or other type of recording device, or other data associated with vehicle operation; trip-based data such as GPS location, time of day, day of week, fuel consumption, road conditions, information about the type of trip or route; and/or environment data such as temperature, precipitation, wind, fog, severe weather alert, weather conditions or any other information about the environment proximate to the vehicle 205. The vehicle 205 may continuously collect the telematics data or at periodic intervals (e.g., every five seconds, every minute, every hour, etc.). In some scenarios, the vehicle 205 may collect telematics even when the vehicle 205 is not currently being operated.

The vehicle 205 may then transmit (228) the collected telematics data to the tip server 220 for analysis. The vehicle 205 may transmit the data over one or more networks, such as the network 110 as described in FIG. 1. In some embodiments, the networks may include a mesh and/or ad hoc network of other vehicles. The vehicle 205 may send the telematics data as the vehicle 205 collects the telematics data or periodically (such as every thirty seconds, every minutes, every five minutes).

The tip server 215 may then analyze the received telematics data to determine (232) that a driving tip should be provided to the driver of the vehicle 205. For example, the tip server 215 may determine that a driving tip related to the turning and/or braking habits of the driver should be provided. As another example, the tip server 215 may determine that a driving tip related to distracted driving should be provided. In some embodiments, the tip server 215 may utilize a driving tip model that analyzes the received telematics data to determine an appropriate driving tip.

After the tip server 215 determines that a driving tip should be provided to the driver, the tip server 215 may interact with the treatment generation model 220 to generate (236) a treatment for how the driving tip is provided. To this end, the treatment generation model 220 may utilize uplift modeling techniques to generate the treatment. More particularly, the treatment generation model 220 may randomly select an option for each treatment facet based on a weight and confidence score associated with each option. For example, the treatment facets may include a channel of delivery, a timing of delivery, a tip content (such as a statistic, chart, graph, or an amount of savings included in addition to the driving tip itself), and a tone used to present the driving tip.

As described above, if the tip server 215 has provided relatively few tips to the driver of the vehicle 205, then the weights associated with each option may be based on the option's effectiveness for drivers sharing similar demographic and/or geographic characteristics. On the other hand, if the tip server 215 has provided relatively more tips to the driver, the uplift modeling techniques will have adjusted the weights to such that the treatment is personalized to the driver of the vehicle 205. Thus, unlike when traditional A/B testing techniques are applied, the treatment for the driving tip is generated such that it reflects the specific characteristics of the driver of the vehicle 205.

According to the illustrated embodiments, after the treatment generation model 220 and the tip server 215 determine the treatment for the driving tip, the tip server 215 provides (240) the driving tip to the driver of the vehicle 205, in accordance with the generated treatment. It should be appreciated that in some scenarios, the provision of the driving tip and the generation of the treatment may occur at different time frames. For example, an option for channel of delivery may be a monthly invoice or bill mailed to the driver. In this example, the tip server 215 may not provide the driving tip until several weeks after the treatment was generated. As another example, an option for the timing of delivery may be the completion of a trip. In this example, the tip server 215 may not provide the driving tip until the tip server 215 receives additional telematics data from the vehicle 205 indicating that a trip has been completed.

The signal diagram 200 may proceed when the vehicle 205 collects (244) updated telematics data after the tip server 215 has provided the driving tip to the driver of the vehicle 205. The vehicle 205 may then transmit (248) the updated telematics data to the tip server 215 for analysis.

The tip server 215 may analyze the updated telematics data to determine (252) an effectiveness of the driving tip. For some driving tips, the tip server 215 may compare the updated telematics data to the initial telematics data to detect whether the driver of the vehicle 205 complied with the driving tip. For example, the tip server 215 may generate a score corresponding to the driver's acceleration behavior. In this example, a driving tip may indicate that the driver accelerates too fast from a stop and should instead accelerate more gradually. Accordingly, the tip server 215 may determine a new acceleration score based on the updated telematics data and compare the new acceleration score to the acceleration score that caused the driving tip to be provided. If the new acceleration score is an improvement on the prior acceleration score, then the tip server 215 may determine that the provided tip was effective. For some other driving tips, the tip server 215 may be able to determine an effectiveness without comparison to the original telematics data. For example, the driving tip may indicate that the driver should not text while driving. In this example, if the updated telematics data includes data indicating that the driver has sent a text message after the beginning of a trip, then the tip server 215 may determine that the driving tip was not effective.

In some embodiments, in addition to the binary determination of whether or not the tip was effective, the tip server 215 may also determine a measure of improvement. Returning to the acceleration score example, the tip server 215 may determine that the updated telematics data indicates an improvement of, for example, 10% in the acceleration score.

Based on the effectiveness of the provided driving tip, the tip server 215 may then update (256) the treatment generation model 220 utilizing uplift modeling techniques. If the tip server 215 determined that the driving tip was effective, the tip server 215 may increase the weights associated with each option utilized in the treatment of the driving tip. On the other hand, if the tip server 215 determined that the driving tip was ineffective, the tip server 215 may decrease the weights associated with each option utilized in the treatment of the driving tip. In embodiments in which the tip server 215 determines a measure of effectiveness, the amount the weights are increased or decreased may scale based upon the determined measurement. It should be appreciated that the tip server 215 and the vehicle 205 can repeatedly perform any or all of the steps of the signal diagram 200 to further personalize the treatment generation model 220 to the driver of the vehicle 205.

Figures 3A, 3B, 3C, 3D:
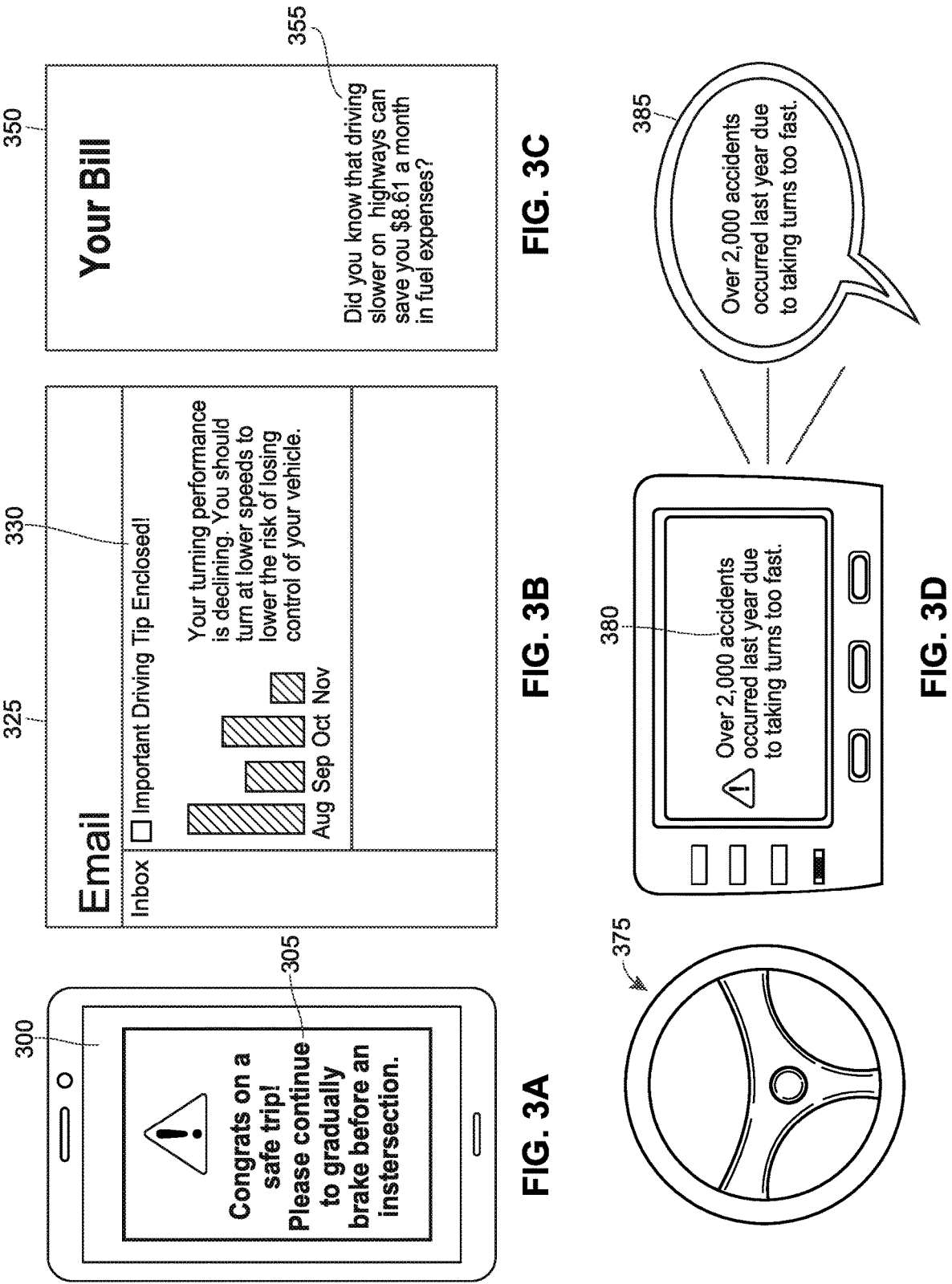
FIGS. 3A-3D depict example interfaces associated with the provision of driving tips in accordance with some embodiments.

Referring now to FIGS. 3A-D, depicted are example driving tips provided to drivers via example treatments. FIG. 3A illustrates a driving tip 305 provided to a personal electronic device 300 associated with the driver. As illustrated, the tip 305 was provided to the personal electronic device 300 after the completion of a trip. The tip may have been provided via a SMS channel or as a push message associated with an application executing on the personal electronic device 300. Further, as illustrated, the tone of the tip 305 is encouraging and/or congratulatory.

Turning to FIG. 3B, illustrated is a driving tip 330 provided to an email account 325 associated with the driver. As illustrated, the tip 330 includes a tip content of a bar chart that indicates worsening turning behavior. The tip 330 is also presented in a more serious tone than, say, the tip 305.

With reference to FIG. 3C, illustrated is a driving tip 355 provided on a monthly bill 350 for an account associated with the driver. The tip 355 includes a tip content of an amount of money that can be saved by complying with the tip 355. Further, the tip 355 is presented in a manner that has an curiosity-inducing tone.

Turning now to FIG. 3D, illustrated are driving tips 380 and 385 provide via in-vehicle systems 375 of a vehicle being operated by the driver. The tip 380 is provided via a display on an infotainment console and the tip 385 is an audio message output via one or more vehicle speakers. The tips 380 and 385 include a tip content of a statistic and utilizes a factual tone.

It should be appreciated that the example tips 305, 330, 355, 380, and 385 merely represent one example combination of treatment facet options. Of course, other combinations of treatment facet options may be provided based on the application of the uplift modeling techniques to individual drivers. Further, the example tips 305, 330, 355, 380, and 385 illustrate only one particular manner that a driving tip may be provided via a particular treatment channel. Accordingly, it is envisioned that for each channel of delivery, any known technique particular to each channel may be utilized to present a driving tip.

Figure 4:
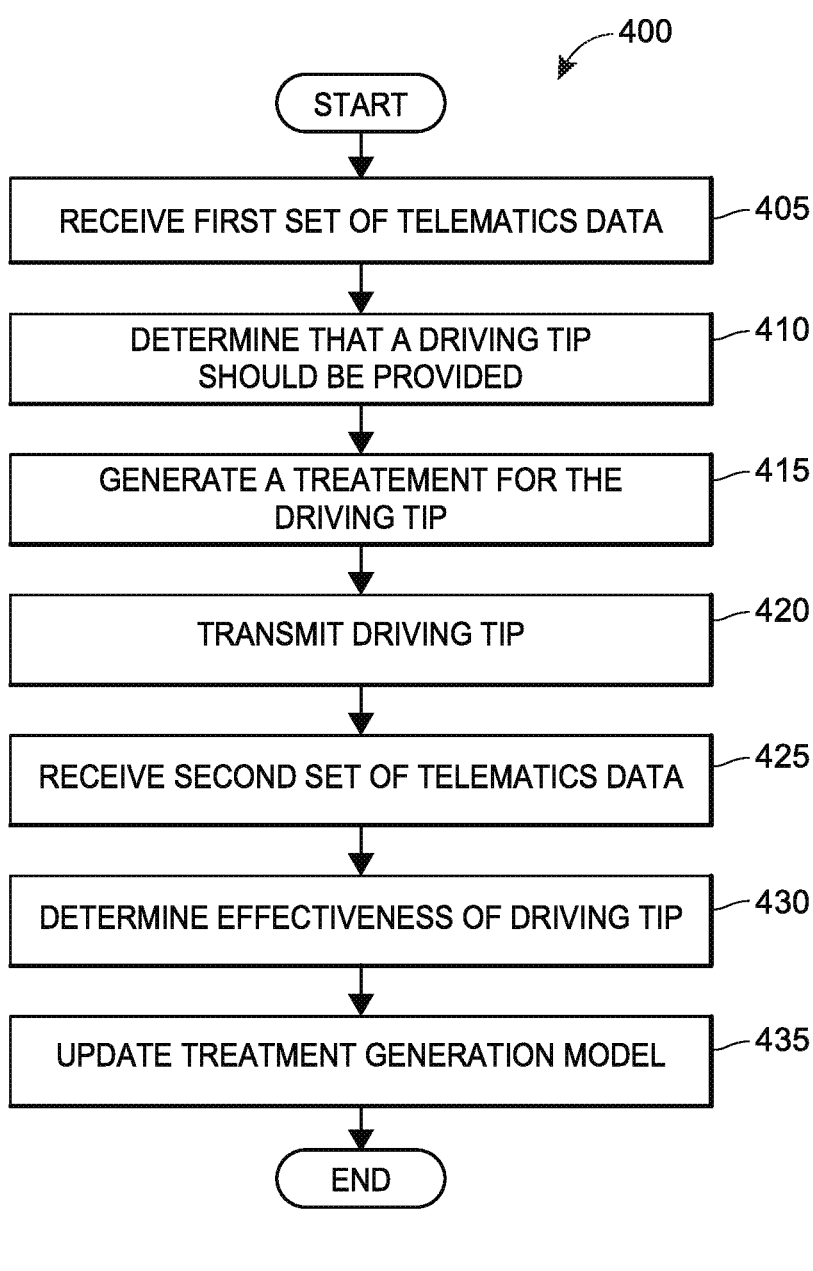
FIG. 4 depicts a flow diagram of providing driving tips and updating treatment generation models in accordance with some embodiments

FIG. 4 depicts an example method 400 for providing driving tips and updating treatment generation models. At least a portion of the method 400 may be performed by one or more computing devices, in an embodiment. For example, the method 400 may be performed by a server such as the tip server 115 as described with respect to FIG. 1.

The method 400 may begin when the server receives a first set of telematics data associated with a vehicle driven by a driver (step 405). In some embodiments, the vehicle may transmit the first set of telematics data to the server. In other embodiments, a personal electronic device associated with the vehicle may transmit the first set of telematics data.

At step 410, the server analyzes, using one or more processors, the first set of telematics data to determine that a driving tip should be provided to the driver. For example, the server may determine that a driver tends to drift out of their lane too often. In some embodiments, the server may use a tip generation model to analyze the first set of telematics data and to determine a driving tip to provide to the driver of the vehicle.

At step 415, the server generates, using a treatment generation model, a treatment for providing the driving tip to the driver. The treatment may include several facets, such as a channel of delivery, a timing of delivery, a tip content, and/or a tone. Additionally, the treatment generation model may utilize uplift modeling techniques to select an option for each facet. To this end, the treatment generation model may include a plurality of possible channels of delivery, timings of delivery, and tip contents and associate each of the possible channels of delivery, timings of delivery, and tip contents with an initial score. The server may assign, using the one or more processors, the initial scores for the possible channels of delivery, timings of delivery, and tip contents based on demographic data of the driver and an effectiveness of the channel of delivery, timing of delivery, or tip content for drivers having similar demographic data. In some embodiments, the drivers having similar demographic data are located within a geographic range of the driver.

Additionally, the treatment generation model may associate the possible channels of delivery, timings of delivery, and tip contents with a confidence level based on a number of treatments having the channel of delivery, timing of delivery, or tip content provided to drivers having similar demographic data. Accordingly, to generate the treatment, the server may weight, using the one or more processors, the channels of delivery, timings of delivery and tip contents based on the respective initial scores and confidence levels; and randomly select, using the one or more processors, a particular channel of delivery, timing of delivery and tip content, wherein the weights indicate a likelihood of each channel of delivery, timing of delivery, or tip content being randomly selected.

At block 420, the server, in accordance with the treatment, may provide, using the one or more processors, the driving tip to the driver associated with the vehicle. After the provision of the driving tip, the server may receive a second set of telematics data associated with the vehicle (block 425).

At block 430, the server may determine, using the one or more processors, an effectiveness of the driving tip. To determine the effectiveness of the driving tip, the server may compare, using the one or more processors, the first set of telematics data to the second set of telematics data to determine whether the driver complied with the driving tip. In some embodiments, the server may determine a measurement indicative of how effective, or ineffective, the driving tip was at modifying the driver behavior.

At block 435, based on the effectiveness of the driving tip, the server may update, using the one or more processors, the treatment generation model. To update the treatment generation model, the server may determine, using the one or more processors, that the driver complied with the driving tip and increase, using the one or more processors, the initial score for the channel of delivery, timing of delivery, or tip content for the driving tip treatment. On the other hand, the server may also determine, using the one or more processors, that the driver did not comply with the driving tip and decrease, using the one or more processors, the initial score for the channel of delivery, timing of delivery, or tip content for the driving tip treatment. In some embodiments, the amount the server increases or decrease the initial score is based upon the measurement of effectiveness for the driving tip. It should be appreciated that the method 500 may include additional, fewer, or alternative steps, including those described elsewhere herein.

Figure 5:
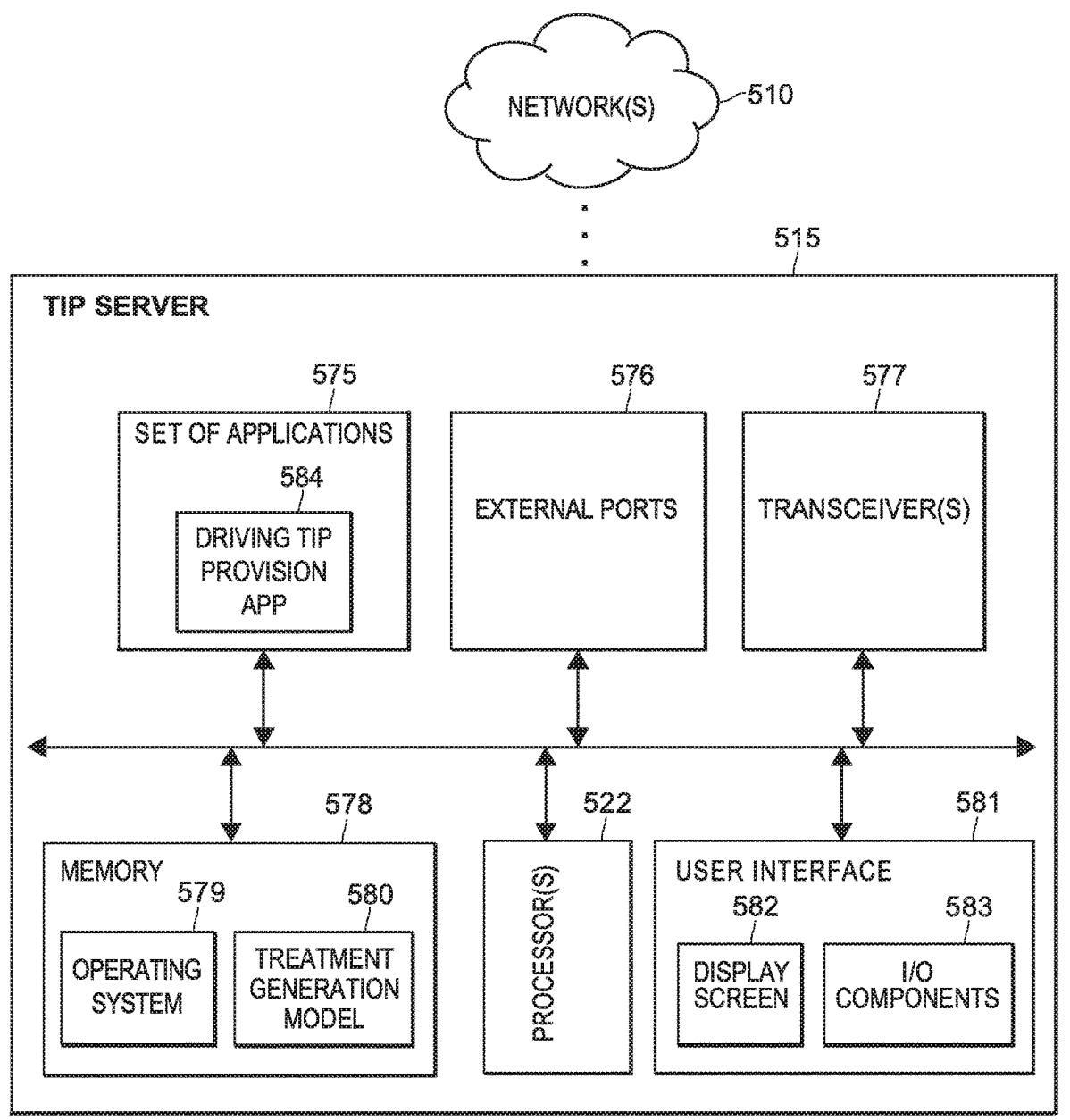
FIG. 5 is a block diagram of a computing device in accordance with some embodiments.

FIG. 5 illustrates a diagram of an exemplary tip server 515 (such as the tip server 115 as discussed with respect to FIG. 1) in which the functionalities as discussed herein may be implemented.

The tip server 515 may include one or more processors 522 as well as a memory 578. The memory 578 may store an operating system 579 capable of facilitating the functionalities as described herein. The memory 578 may further store a treatment generation model that generates a treatment for a driving tip based on a driver's characteristics. The tip server 515 may also store a set of applications 575 (i.e., machine readable instructions). For example, one of the set of applications 575 may be a driving tip provision application 584 that provides driving tips to drivers based on telematics data. The driving tip provision application 584 may interact with the treatment generation model 580 to determine how the driving tip should be provided to the drivers. It should be appreciated that other applications are envisioned.

The one or more processors 522 may interface with the memory 578 to execute the operating system 579 and the set of applications 575. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The tip server 515 may further include a one or more transceivers 577 configured to communicate data via one or more networks 510. According to some embodiments, the one or more transceivers 577 may be WWAN, WLAN, and/or WPAN transceivers functioning in accordance with IEEE standards, 3GPP standards, or other standards, and configured to receive and transmit data via one or more external ports 576. For example, the one or more transceivers 577 may receive, via the network 510, sets of telematics data from vehicles.

The tip server 515 may further include a user interface 581 configured to present information to the individual and/or receive inputs from the individual. As shown in FIG. 5, the user interface 581 may include a display screen 582 and/or I/O components 583 (e.g., ports, capacitive or resistive touch sensitive input panels, keys, buttons, lights, LEDs, speakers, microphones). According to the present embodiments, the user may access the tip server 515 via the user interface 581 to update the operating system 579 and/or perform other functions. In some embodiments, the tip server 515 may perform the functionalities as discussed herein as part of a "cloud" network or can otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the one or more processors 522 (e.g., working in connection with the operating system 579) to facilitate the functions as described herein. In this regard, the program code may be implemented in any desired language, and may be implemented as machine code, assembly code, byte code, interpretable source code or the like (e.g., via Python, or other languages, such as C, C++, Java, Actionscript, Objective-C, Javascript, CSS, XML). In some embodiments, the computer program product may be part of a cloud network of resources.

In some aspects, drivers may opt-in to a rewards, loyalty, or other program. The driver may allow a remote server, such as a tip server, to collect sensor, telematics, vehicle, mobile device, and other types of data discussed herein. With driver permission or affirmative consent, the data collected may be analyzed to provide certain benefits to customers. For instance, insurance cost savings may be provided to lower risk or risk averse drivers.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary and does not describe every possible embodiment, as describing every possible embodiment would be impractical, if not impossible. One could implement numerous alternate embodiments, using either current technology or technology developed after the filing date of this application.

We claim:

1. A computer implemented method comprising:

receiving, by one or more processors, a first set of telematics data collected by one or more sensors associated with a vehicle driven by a driver;

analyzing, by the one or more processors, the first set of telematics data to determine a driving tip to be provided to the driver;

generating, by the one or more processors, a treatment for providing the driving tip to the driver, the treatment being generated using a treatment generation model and including a plurality of treatment facets;

wherein the treatment generation model includes a plurality of options for each treatment facet of the plurality of treatment facets;

wherein the treatment generation model determines a set of drivers having similar characteristics as the driver; and wherein the treatment generation model selects an option of the plurality of options for each treatment facet of the plurality of treatment facets by applying uplift modeling techniques and by combining (i) a respective weight associated with the option based upon an effectiveness of the option for drivers within the set of drivers, and (ii) a respective confidence score associated with the option based upon a sample size of treatments containing the option provided to the drivers within the set of drivers;

providing, by the one or more processors, the driving tip to the driver in accordance with the treatment;

receiving, by the one or more processors, a second set of telematics data collected by the one or more sensors after providing the driving tip;

determining, by the one or more processors, whether the driver complied with the driving tip based on the second set of telematics data; and updating, by the one or more processors, the treatment generation model by adjusting the respective weight and the respective confidence score associated with the option, as selected, for each treatment facet of the plurality of treatment facets utilized in the treatment to personalize future treatments for the driver.

2. The computer implemented method of claim 1, wherein:

the treatment generation model includes a plurality of possible channels of delivery, timings of delivery, and tip contents; and the treatment generation model associates each of the plurality of possible channels of delivery, timings of delivery, and tip contents with an initial score.

3. The computer implemented method of claim 2, further comprising:

determining, by the one or more processors, the initial score for each of the plurality of possible channels of delivery, timings of delivery, and tip contents based upon demographic data of the driver and an effectiveness of each of the plurality of possible channels of delivery, timings of delivery, and tip contents for other drivers having similar demographic data.

4. The computer implemented method of claim 3, wherein the other drivers having similar demographic data are located within a geographic range of the driver.

5. The computer implemented method of claim 2, wherein:

the treatment generation model associates each of the plurality of possible channels of delivery, timings of delivery, and tip contents with a corresponding confidence level based upon a corresponding sample size associated with a number of treatments having at least one of the plurality of possible channels of delivery, timings of delivery, or tip contents provided to other drivers having similar demographic data as the driver.

6. The computer implemented method of claim 5, wherein generating the treatment comprises:

assigning, by the one or more processors, weights to the plurality of possible channels of delivery, timings of delivery, and tip contents based upon respective initial scores and confidence levels; and selecting, by the one or more processors, a channel of delivery, a timing of delivery, and a tip content based upon the weights and the confidence levels, as assigned.

7. The computer implemented method of claim 1, wherein updating the treatment generation model comprises, when the driver complied with the driving tip:

increasing, by the one or more processors, the respective weight and the respective confidence score associated with the option, as selected, for each treatment facet of the plurality of treatment facets utilized in the treatment.

8. The computer implemented method of claim 1, wherein updating the treatment generation model comprises, when the driver did not comply with the driving tip:

decreasing, by the one or more processors, the respective weight and the respective confidence score associated with the option, as selected, for each treatment facet of the plurality of treatment facets utilized in the treatment.

9. A computer system comprising:
one or more sensors associated with a vehicle;
one or more processors;
one or more transceivers adapted to communicate with the vehicle driven by a driver;
a non-transitory program memory coupled to the one or more processors and storing executable instructions that, when executed by the one or more processors, cause the computer system to:
    receive, via the one or more sensors, a first set of telematics data associated with the vehicle;
    analyze the first set of telematics data to determine a driving tip to be provided to the driver;
    generate, using a treatment generation model, a treatment for providing the driving tip to the driver, the treatment including a plurality of treatment facets;
        wherein the treatment generation model includes a plurality of options for each treatment facet of the plurality of treatment facets;
        wherein the treatment generation model determines a set of drivers having similar characteristics as the driver; and
        wherein the treatment generation model selects an option of the plurality of options for each treatment facet of the plurality of treatment facets by applying uplift modeling techniques and by combining (i) a respective weight associated with the option based upon an effectiveness of the option for drivers within the set of drivers, and (ii) a respective confidence score associated with the option based upon a sample size of treatments containing the option provided to the drivers within the set of drivers;
    provide, by the one or more processors, the driving tip to the driver in accordance with the treatment;
    receive, by the one or more processors, a second set of telematics data collected by the one or more sensors after providing the driving tip;
    determine, by the one or more processors, whether the driver complied with the driving tip based on the second set of telematics data; and
    update, by the one or more processors, the treatment generation model by adjusting the respective weight and the respective confidence score associated with the option, as selected, for each treatment facet of the plurality of treatment facets utilized in the treatment to personalize future treatments for the driver.

10. The computer system of claim 9, wherein:
the treatment generation model includes a plurality of possible channels of delivery, timings of delivery, and tip contents; and
the treatment generation model associates each of the plurality of possible channels of delivery, timings of delivery, and tip contents with an initial score.

11. The computer system of claim 10, wherein the instructions, when executed by the one or more processors, further cause the computer system to:
determine the initial score for each of the plurality of possible channels of delivery, timings of delivery, and tip contents based upon demographic data of the driver and an effectiveness of each of the plurality of possible channels of delivery, timings of delivery, and tip contents for other drivers having similar demographic data.

12. The computer system of claim 11, wherein the other drivers having similar demographic data are located within a geographic range of the driver.

13. The computer system of claim 10, wherein:
the treatment generation model associates each of the plurality of possible channels of delivery, timings of delivery, and tip contents with a corresponding confidence level based upon a corresponding sample size associated with a number of treatments having at least one of the the plurality of possible channels of delivery, timings of delivery, and tip contents provided to other drivers having similar demographic data as the driver.

14. The computer system of claim 9, wherein the set of drivers having similar demographic data as the driver are located within a geographic range of the driver.

15. The computer system of claim 9, wherein the instructions, when executed by the one or more processors, further cause the computer system to update the treatment generation model comprises, when the driver complied with the driving tip:
increasing, by the one or more processors, the respective weight and the respective confidence score associated with the option of the plurality of options, as selected, for each treatment facet of the plurality of treatment facets utilized in the treatment.

16. The computer system of claim 9, wherein the instructions, when executed by the one or more processors, further cause the computer system to update the treatment generation model comprises, when the driver did not comply with the driving tip:
decreasing, by the one or more processors, the respective weight and the respective confidence score associated with the option, as selected, for each treatment facet of the plurality of treatment facets utilized in the treatment.

17. A non-transitory computer-readable medium storing instructions, wherein the instructions, upon execution, cause one or more processors to:
receive a first set of telematics data associated with a vehicle, the first set of telematics data being collected by one or more sensors associated with the vehicle;
analyze the first set of telematics data to determine a driving tip to be provided to a driver;
generate, using a treatment generation model, a treatment for providing the driving tip to the driver, the treatment including a plurality of treatment facets;
    wherein the treatment generation model includes a plurality of options for each treatment facet of the plurality of treatment facets;
    wherein the treatment generation model determines a set of drivers having similar characteristics as the driver; and
    wherein the treatment generation model selects an option of the plurality of options for each treatment facet of the plurality of treatment facets by applying uplift modeling techniques and by combining (i) a respective weight associated with the option based upon an effectiveness of the option for drivers within the set of drivers, and (ii) a respective confidence score associated with the option based upon a sample size of treatments containing the option provided to the drivers within the set of drivers;
provide, by the one or more processors, the driving tip to the driver in accordance with the treatment;
receive, by the one or more processors, a second set of telematics data collected by the one or more sensors after providing the driving tip;

determine, by the one or more processors, whether the driver complied with the driving tip based on the second set of telematics data; and update, by the one or more processors, the treatment generation model by adjusting the respective weight and the respective confidence score associated with the option, as selected, for each treatment facet of the plurality of treatment facets utilized in the treatment, to personalize future treatments for the driver.

18. The computer implemented method of claim 2, wherein the tip contents include a money amount, a likelihood of damage or injury, a comparison to other drivers, or an indication of performance over time.

19. The non-transitory computer-readable medium of claim 17, wherein:

the treatment generation model includes a plurality of possible channels of delivery, timings of delivery, and tip contents; and the treatment generation model associates each of the plurality of possible channels of delivery, timings of delivery, and tip contents with an initial score.

20. The non-transitory computer-readable medium of claim 17, wherein updating the treatment generation model comprises, when the driver complied with the driving tip:

increasing, by the one or more processors, the respective weight and the respective confidence score associated with the option, as selected, for each treatment facet of the plurality of treatment facets utilized in the treatment.

21. The non-transitory computer-readable medium of claim 17, wherein updating the treatment generation model comprises, when the driver did not comply with the driving tip:

decreasing, by the one or more processors, the respective weight and the respective confidence score associated with the option, as selected, for each treatment facet of the plurality of treatment facets utilized in the treatment.

\* \* \* \* \*